United States Patent [19]    [11]  4,234,808
Geppert et al.    [45]  Nov. 18, 1980

[54] STEPPING MOTOR

[75] Inventors: Klaus Geppert, Friesenheim; Günter Heine, Seelbach; Karl Hübner, Kippenheim; Günter Ose, Seelbach; Bernd Seeger, Lahr; Claus Schäffer, Friesenheim; August Spiesberger, Lahr, all of Fed. Rep. of Germany

[73] Assignee: Gerhard Berger GmbH & Co. Fabrik Elektrischer Messgerate, Lahr, Fed. Rep. of Germany

[21] Appl. No.: 830,124

[22] Filed: Sep. 2, 1977

[30] Foreign Application Priority Data

Jan. 29, 1977 [DE] Fed. Rep. of Germany ....... 2703791

[51] Int. Cl.³ ............................................ H02K 37/00
[52] U.S. Cl. ................................... 310/49 R; 310/45; 310/68 R; 310/156; 310/258; 318/696
[58] Field of Search ................... 318/696, 138; 310/49, 310/162, 163, 89, 90, 216, 218, 254, 258, 156, 45, 178, 215, 194, 68 R, 71

[56] References Cited

U.S. PATENT DOCUMENTS

| 2,982,872 | 5/1961 | Fredrickson | 310/49 R |
|---|---|---|---|
| 2,999,176 | 9/1961 | Lindström | 310/194 |
| 3,117,268 | 1/1964 | Madsen | 310/49 R |
| 3,506,859 | 4/1970 | Snowdon | 310/89 |
| 3,621,312 | 11/1971 | Palermo | 310/49 R |
| 3,777,196 | 12/1973 | Field | 310/49 R |
| 3,862,492 | 1/1975 | Crabb | 310/215 |
| 3,956,678 | 5/1976 | Byrne | 310/216 |
| 4,048,530 | 9/1977 | Kaufman | 310/90 |

FOREIGN PATENT DOCUMENTS 1513747  4/1970  Fed. Rep. of Germany ............. 310/49

OTHER PUBLICATIONS

IBM Tech. Discl. Bulletin; Davies & Desautels; Wound Rotor Incremental Motor; vol. 12, No. 12.

Primary Examiner—R. Skudy
Attorney, Agent, or Firm—Norbert P. Holler

[57] ABSTRACT

A stepping motor of the homopolar design with a step angle of 3.6° and having a generally cubic form is disclosed. The motor includes a generally square, single-section laminated stator which has only four stator poles extending radially inwardly from the middle regions of the straight sides, and a concentric rotor secured to a shaft journaled in a pair of bearing bells fixed to the stator at the opposite faces thereof and having the same generally square configuration. The rotor includes a disc-shaped permanent magnet of high remanent energy density $(B \times H)_{max} \geq 10 \times 10^6$ GOe, and a pair of annular steel rotor elements provided at the working air gap with identical numbers $Z_r$ of rotor teeth of pitch $\tau_r = 360°/Z_r$. Each stator pole is provided at the working air gap with four or five stator pole teeth of pitch $\tau_s = 360°/Z_s$, where $Z_s$ is the theoretically maximum available number of stator pole teeth and must be evenly divisible by 4, and $Z_s = Z_r - 1 \pm k$ where k is an even integer and $0 \leq k \leq 6$. A special twin-section insulation member adapted to be axially fitted into the stator from the opposite faces thereof and designed to permit simultaneous machine winding of the field windings onto the respective stator poles is also disclosed. This abstract is not to be taken either as a complete exposition or as a limitation of the present invention, however, the full nature and extent of the invention being discernible only by reference to and from the entire disclosure.

11 Claims, 15 Drawing Figures

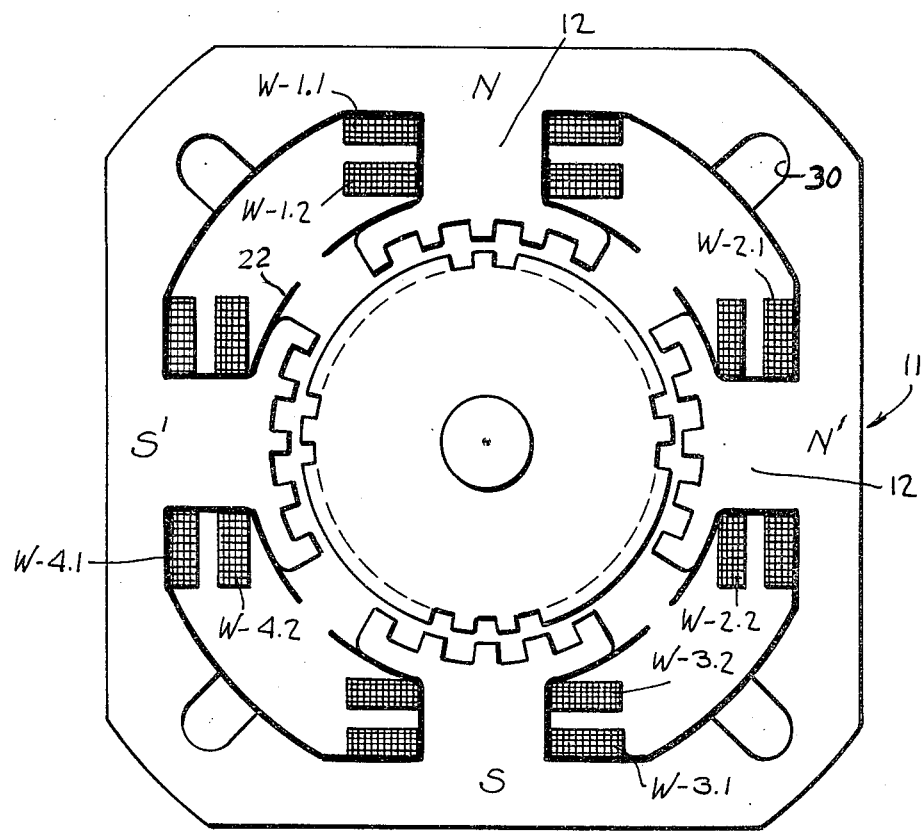
Fig.4.
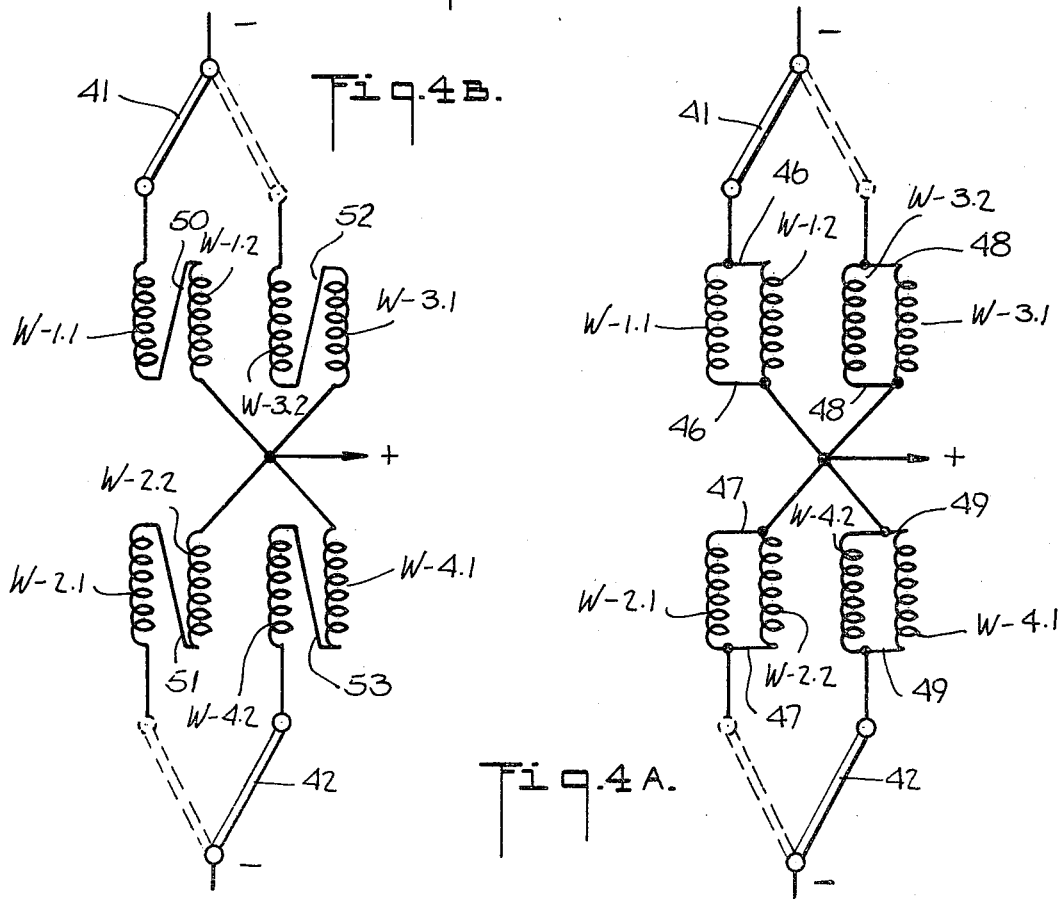
Fig.4B.
Fig.4A.

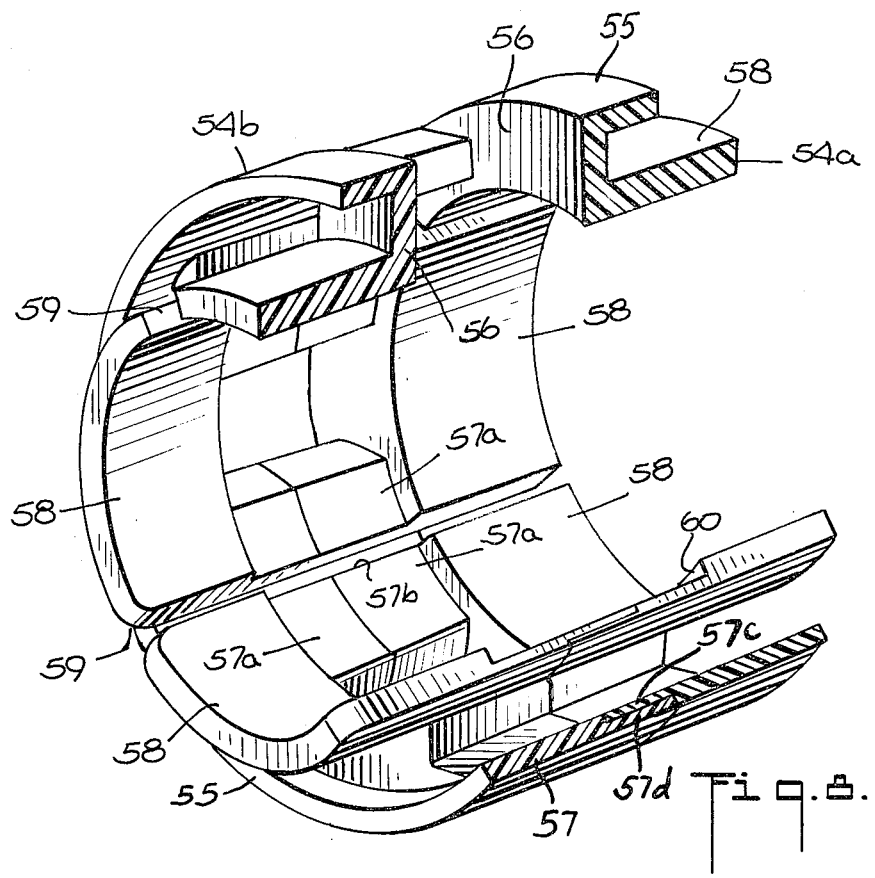
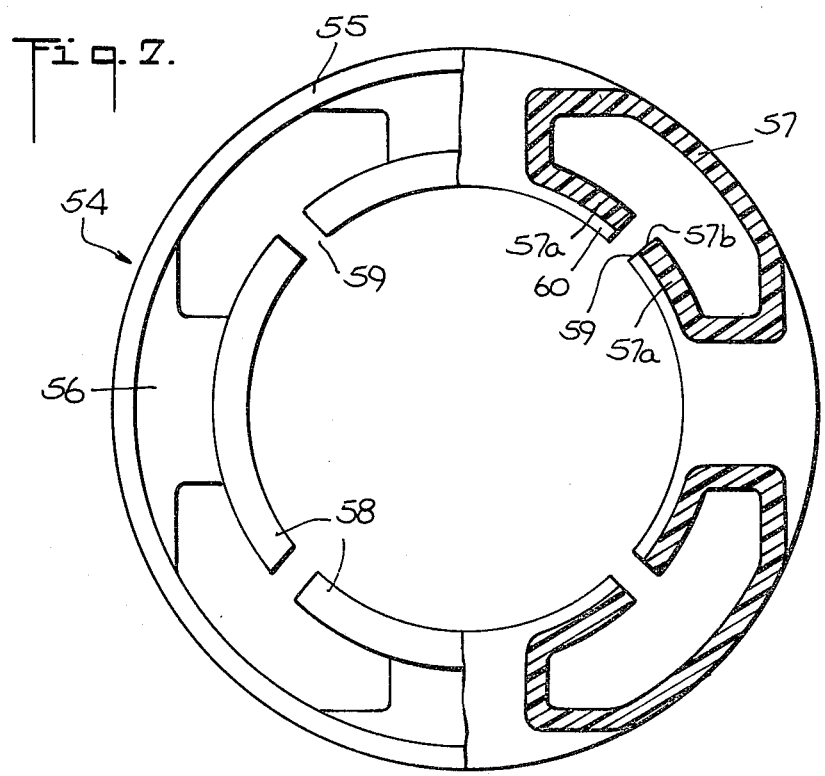

STEPPING MOTOR

This invention relates to a stepping motor which is adapted to drive, under electronic control and in steps in any desired direction of rotation, a round plastic disc arranged on the linearly moving carriage of a printing machine and having, for example, 100 movable type characters.

An office machine (typewriter), which works on this principle, is described, for example, in the American company brochure "Qume The Printed Word" published by Facit-Vertrieb-AG, of Seftigenstr. 57, CH-3000 Berne 17, Switzerland.

There are various types of stepping motors on the market. For this reason it was tried at first to use the existing stepping motors for the above-mentioned special problem. The available stepping motors were, however, found to be unsuitable in many respects for use in several machines that are currently in the development stage, for a variety of reasons. Among these were that such motors had too large a diameter, too great a weight relative to their output, either too small or too large a step angle, and too high production costs.

It is the principal object of the present invention, therefore, to provide a novel and improved special stepping motor by means of which the above-mentioned drawbacks and disadvantages could be eliminated.

More particularly, the new stepping motor according to the present invention works on the known homopolar principle for self-starting synchronous motors. This principle is described, for example, in U.S. Pat. No. 2,982,872, and to the extent required for an understanding thereof the disclosures of that patent are hereby incorporated herein by reference. In terms of construction, however, it was found that a motor such as the one disclosed in the said patent is not free of the above-mentioned drawbacks and that it was necessary, therefore, to abandon the conventional design criteria and to make the stator, the rotor, the step angle, the winding insulation and the winding technique considerably different from those elements as used in the conventional design.

Basically speaking, the present invention provides a stepping motor of the homopolar design which utilizes a layered stator having a plurality of radially inwardly directed stator poles which are toothed at the working air gap, and an axially magnetized rotor including an axially disposed permanent magnet and two magnetically conductive circumferentially toothed steel rotor elements sandwiching the magnet therebetween and secured jointly with the same on a magnetically non-conductive shaft journaled in a pair of bearings mounted in respective magnetically non-conductive bearing bells. In its overall configuration, the motor is not cylindrical in shape but rather has a generally cubic form, apart from being slightly rounded or chamfered along its edges parallel to the shaft axis, by virtue of the stator and the bearing bells each being essentially square in outline except for having chamfered edges along the corners parallel to the shaft axis. The stator is a single-section laminate, however, and thus the motor does not have an external yoke housing axially surrounding the stator such as is required for a multi-section stator in order to enable the magnetic circuit to be completed. The fastening of the two bearing bells to the stator in properly centered relation is effected by parallelly arranged bolt or rivet-type fastening means extending through suitable recesses provided in the stator in the regions of the four chamfered corners thereof and corresponding recesses provided in the bearing bells at the four corners thereof.

The stator differs further from the known design in that it has only four poles each extending inwardly from the middle region of a respective one of the four straight sides of the stator, and each stator pole has four or five uniformly pitched teeth on its end face disposed along the circular locus defining the outer boundary of the working air gap, with the space between each two adjacent stator poles being equal to the space that would be required to accommodate one or two additional stator pole teeth at the same uniform pitch. The rotor on the outer periphery of each of its two lateral elements likewise has a set of uniformly pitched teeth. The pitch of the stator pole teeth is expressed by the relation $\tau_s = 360°/Z_s$ where $Z_s$ is the theoretically available number of stator pole teeth, the pitch of the rotor pole teeth is expressed by the relation $\tau_r = 360°/Z_r$ where $Z_r$ is the number of rotor teeth, and the numbers of the two sets of teeth are expressed by the relation $Z_s = Z_r - 1 \pm k$ where k is an even integer (on the basis of the requirement that $Z_s \neq Z_r$) and $0 \leq k \leq 6$, and $Z_s$ must be divisible by four. A step angle $\phi$ of 3.6° is achieved in a stepping motor of this invention which has, for example, 25 rotor teeth and 16 or 20 stator pole teeth, with the theoretical number of stator pole teeth being 24.

The rotor magnet is a thin ring disc magnet which is axially magnetized and is made of a highly coercive magnetic material, advantageously a cobalt and rare earth metal alloy, and has a relatively high remanent energy density $(B \times H)_{max} \geq 10 \times 10^6$ gauss-oersteds (10 MGOe). The ratio of disc diameter to disc thickness ranges from about 4 to about 20. Correspondingly, the two rotor sections or elements on which the rotor teeth are provided likewise have a ring disc form and are inwardly chamfered along their outer peripheries on the sides facing each other and the magnet, the angle of the chamfer being between about 30° and 60°.

The insulation of the stator against the four pole windings consists of a specially shaped twin-section annular insulating member the sections of which can be fitted into the stator from the opposite sides of the latter so as to cover all four stator poles but in a fashion which leaves between each two adjacent poles a gap not less than 2 mm wide and enables the insulating member to serve as wire guides for the simultaneous winding of all four stator poles by means of a needle winding machine. The four pole or stator field windings may consist of four monofilar or single-wire windings, or alternatively of four bifilar or two wire windings with the two partial windings of each pole winding being connected in series or in parallel, but in either case the windings are so arranged that only one pole winding per phase is energized after each step.

The foregoing and other objects, characteristics and advantages of the present invention will be more clearly understood from the following detailed description thereof when read in conjunction with the accompanying drawings, in which:

FIG. 3A is a schematic wiring diagram for the motor shown in FIG. 3;

FIGS. 3B and 3C are diagrams illustrating, respectively, the current flow and the polarities in the various windings for each motor step;

FIG. 4 is a view similar to FIG. 3 and illustrates the stator with a set of bifilar windings on the stator poles, the insulation again being shown only schematically;

FIGS. 4A and 4B are schematic wiring diagrams for the motor of 4 and illustrate the partical windings of the various full windings connected in parallel and in series, respectively;

FIG. 7 is a side view, partly in section, of one section of the insulation member shown in FIGS. 5 and 6;

FIG. 8 is a perspective illustration, partly in section, of the insulation member shown in FIGS. 5 and 6;

FIG. 9 is a diagrammatic side view of the salient elements of a printing machine utilizing a 100 type character rotatable printing disc of the type to be activated by a stepping motor according to the present invention; and FIG. 9A is a diagrammatic plan view of the printing disc of the machine shown in FIG. 9.

Figure 1:
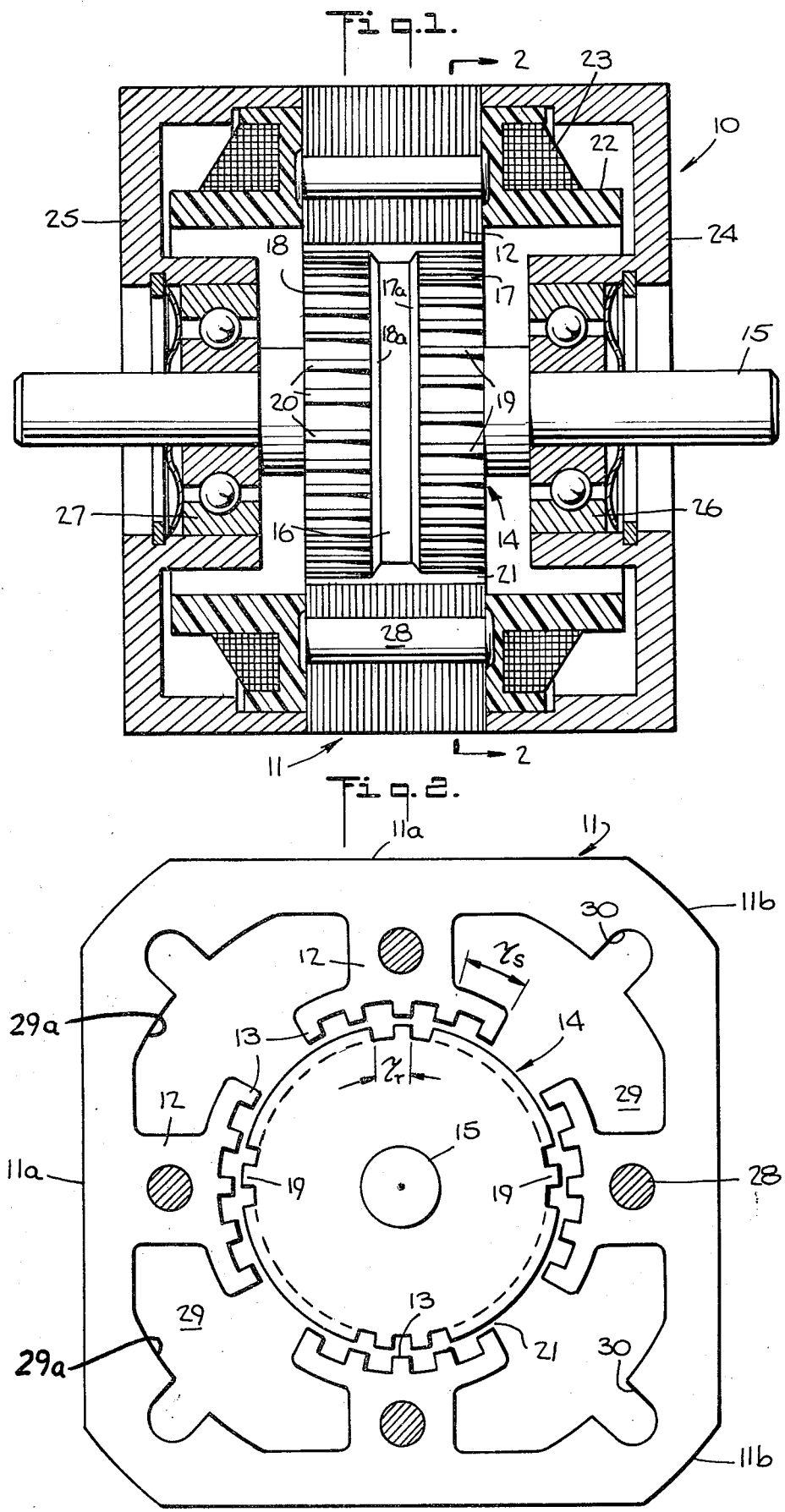
FIG. 1 is an axial section through a stepping motor according to the present invention.

Referring now to the drawings in greater detail, a stepping motor 10 according to the basic principles of the present invention includes (FIG. 1) a laminated steel stator 11 having a plurality of inwardly directed poles 12 provided with teeth 13 on their circularly curved inwardmost faces (FIG. 2), and a rotor 14 mounted on a rotatable shaft 15 and consisting of an axially magnetized annular permanent magnet 16 and a pair of annular rotor elements 17 and 18 sandwiching the magnet therebetween. The rotor elements are provided with respective sets of external teeth 19 and 20 the circular locus of the outermost surfaces of which is spaced from the circular locus of the inwardmost surfaces of the stator pole teeth 13 by a working air gap 21. The stator poles are covered, except at the teeth, by a twin-section insulation member 22 over which the various field windings 23 for the individual poles are wound. The windings are covered by a pair of housing elements or end bells 24 and 25 which are secured to the stator at opposite sides thereof and which at their central regions support a pair of bearings 26 and 27 for the shaft 15. The motor 10, it should be pointed out, is defined as being a stepping motor of the homopolar design, because of the fact that the magnet 16 is axially magnetized, which means that all the poles that are formed at one of the toothed rotor elements 17 and 18 are "N" poles while all the poles that are formed at the other one of the said rotor elements are "S" poles.

As will be seen, to a certain extent the motor structure outlined above generally parallels that of the motor disclosed in U.S. Pat. No. 2,982,872. Nevertheless there are a number of major differences between the patented motor and that of the present invention, which will now be described. Inasmuch as a great many considerations, supported by extensive calculations and tests, entered into the determination of the various individual features of the stepping motor of the present invention, however, it is deemed advisable to discuss the changes and modifications made in the different motor components individually.

(A) Modifications in the Stator

Figure 2:
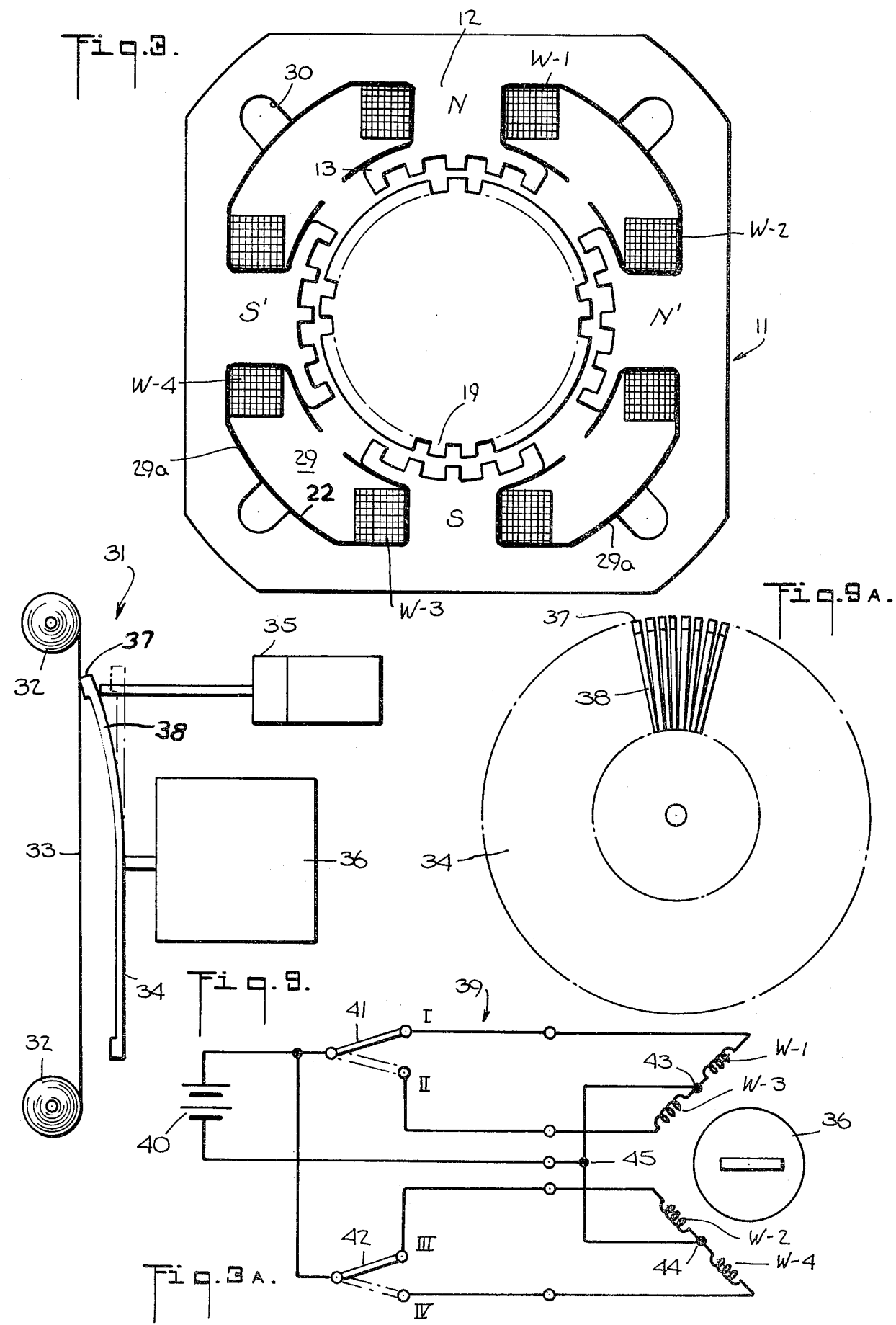
FIG. 2 is a sectional view taken along the line 2—2 in FIG. 1 to illustrate the characteristics and relationships of the stator and rotor of the stepping motor according to the present invention, details not essential for this purpose being omitted for the sake of clarity.

These are represented in FIGS. 1 and 2. The stator 11 is a single-section sheet steel lamination formed with the aid of four rivets 28 and, as shown in FIG. 2, has a generally square form with four sides 11a which are straight except for being chamfered or slightly rounded at the corners, as indicated at 11b. Since the stator is a single-section structure (FIG. 1), devoid of any medial transaxial air gap, there is no need for a yoke to complete the magnetic circuit. The external magnetic stator shell which is required in the patented motor for the magnetic field return thus has been eliminated.

The stator 11 is provided with only four inwardly directed stator poles 12 onto which the windings 23 are wound. Each such pole at its inwardmost surface facing the working air gap 21, is circularly curved and concentric with the axis of the shaft 15. The stator pole teeth 13 advantageously are five in number as shown in FIG. 2 although they may be only four in number (not shown). The maximum possible number of stator pole teeth, which is the sum of the teeth 13 actually provided plus those teeth which are missing due to the provision of the gaps or spaces between the adjacent stator poles 12 (at the rate of one or two per gap, as the case may be), is denoted $Z_s$, and the pitch of the stator pole teeth based on the maximum number $Z_s$ is denoted $\tau_s$. It should be noted that the number of stator pole teeth, i.e. one or two, which are omitted between adjacent stator poles is determined by production considerations. Thus, it is an aspect of the present invention to provide a capability for the field windings to be wound be machine simultaneously onto the four stator poles, and the interpolar gaps are required to accommodate the machine needles. As a practical matter, therefore, the interpolar gap size cannot be less than about 2 mm, and it will be clear that although in a motor of a given size it may be possible to attain this goal through the omission of only four stator pole teeth overall, in a somewhat smaller motor the omission of eight stator pole teeth may be required.

In order to ensure best utilization of the available space and to enable minimization of the size of the motor relative to its output or performance, the four stator poles 12 are arranged in the middle regions of the straight sides 11a of the stator, and the winding spaces 29 are disposed in the corner regions. In these corner regions, the stator is further provided with U-shaped recesses 30 adapted to accommodate respective throughbolts or like fastening means (not shown) to enable the two end housing members or bearing bells 24 and 25 to be secured in properly centered relation to the stator and each other (centering may also be aided by suitable internal chamfers on the bearing bells corresponding to the chamfers 11b on the stator if the bearing bells are designed to accommodate at least in part the circumference of the stator). The external configuration of the bearing bells is the same as that of the stator. The overall motor configuration thus is essentially cubic, which makes the motor of the present invention adaptable to utilization in some environments and applications where a motor with the conventional round or cylindrical configuration cannot be as advantageously used.

(B) Modifications in the Rotor

As a concomitant to the reduction of the stator dimensions, the diameter of the rotor 14 has likewise been reduced. It was necessary, however, that this be done as far as possible without loss of magnetic output. Accordingly, the permanent magnet 16 of the rotor 14 is a highly coercive disc magnet having a very high remanent energy density in excess of $10 \times 10^6$ gauss-oersteds, i.e. $(B \times H)_{max} \geq 10$ MGOe. Suitable materials for this purpose are certain alloys of cobalt and rare earth metals which are commercially available, such as a samarium/cobalt alloy ($Sm/Co_5$) marketed by Brown, Boveri & Cie, A.G. of Mannheim, Germany, and a cobalt/rare earth metal alloy (exact composition not known at this time) marketed by Fried. Krupp GmbH of Essen, Germany under the registered trademark KOERMAX. This choice was based on a number of considerations. Thus, a calculation of the magnetic circuits of various motor models showed that through the use of rotor magnets of this type, even where the same are relatively thin magnet discs and are accompanied by an increase in the air gap induction, it might be possible for the rotor volume to be considerably reduced. These calculations were subsequently fully confirmed by actual test models. In particular, it was found that the use of a high coercitivity magnet made of the aforesaid type of cobalt/rare earth magnetic material makes it possible to attain, in a motor of small dimensions such as here contemplated, a relatively high torque over the entire step frequency range. The use of this material also is significant from a manufacturing standpoint, in that it makes it possible to provide the motor with a relatively large working air gap through the use of a smaller rotor and thereby to minimize the production costs of such a motor. Still further, the use of the said material prevents a possible demagnetization of the rotor in the event of a high-amplitude pulsating field excitation of the stator poles, and it enables the usually required exterior steel housing or yoke for completing the magnetic circuit axially of the stator to be dispensed with.

The optimum ratio of magnetic disc diameter to magnetic disc thickness depends on the axial length of the stepping motor, i.e. of the rotor. For the purposes of the present invention, this ratio is about 20 in axially short stepping motors and about 4 in axially long stepping motors.

As previously stated, the rotor magnet 16 is axially magnetized and is arranged between two magnetically conductive plane-parallel annular discs or rotor elements 17 and 18. Thus, by virtue of the axial magnetization of the disc magnet 16, only "N" poles are formed at one and only "S" poles are formed at the other of the toothed rotor elements 17 and 18. In order to minimize the magnetic stray field losses, however, necessitated by the small thickness of the disc magnet 16, the discs 17 and 18 are provided, on the sides thereof facing the disc magnet 16, with respective peripherally beveled extensions 17a and 18a (FIG. 1), the bevels extending down to the outside diameter of the magnet at an angle of between about 30° and 60° and preferably at a mean angle of about 45°.

The two sets of teeth 19 and 20 provided on the rotor discs or elements 17 and 18 are, of course, identical, the number of rotor teeth on each disc being denoted $Z_r$ and their pitch being denoted $\tau_r$ (FIG. 2). For reasons well known to those skilled in the art, however, the two sets of teeth are circumferentially offset or staggered relative to each other in known manner by a half rotor tooth pitch (FIG. 1). Both the rotor magnet 16 and the two rotor discs 17-18 are fixedly secured to the motor shaft 15, for example by being cemented thereto, and the shaft, in order to avoid a magnetic shunt, is made of nonmagnetizable steel or the like.

(C) Modifications in the Step Angle

A printing machine 31 of the type for which the stepping motor of the present invention is particularly well suited is illustrated schematically in FIG. 9. Only the salient elements of the machine are shown, namely the supply/takeup rolls 32 for the paper tape 33, the plastic printing disc 34, the typeactuating striker device 35, and the stepping motor 36. As previously indicated, in this machine the plastic disc 34 to be driven by the stepping motor has generally one hundred type characters 37 (FIG. 9A) which are provided on radially arranged, elastically movable tongues 38.

In order to meet the requirements of small disc diameter and low moment of inertia in such a system, it is necessary, at a given type spacing, to utilize the full disc circumference. Accordingly, it becomes necessary to use a stepping motor with a step angle $\phi$ of 3.6° (360°/100).

Motors of the known homopolar type operating at a small step angle, e.g. motors such as the one shown in U.S. Pat. No. 2,982,872, require for the customary two-phase control thereof either stator poles with an integral number, i.e. forty-eight, of stator pole teeth conforming to the relation $Z_s' = Z_s - \nu$, where $Z_s'$ denotes the total number of existing stator pole teeth, $\nu$ denotes the number of stator pole teeth omitted between the adjacent poles for enabling the field windings to be applied to the stator poles, and $Z_s$ denotes the maximum possible number of stator pole teeth. At the same time, the rotor consists of a permanent magnet with a relatively low energy density, i.e. $(B \times H)_{max} < 6$ MGOe, and includes two magnetically well conductive rotor pole caps each of which has a different integral number $Z_r$, i.e. fifty, of rotor teeth on its circumference. The step angle of this stepping motor, as is known, thus is 1.8°.

It will be appreciated, therefore, that the abovementioned requirements for a small stepping motor diameter and a step angle of 3.6° cannot be met with such a motor as is disclosed in U.S. Pat. No. 2,982,872, for the following reasons:

1. For the above described known stepping motor with eight stator poles, the stator pole tooth pitch $\tau_s$ and the rotor tooth pitch $\tau_r$ are expressed by the relations $\tau_r = 360°/Z_r$ and $\tau_s = 360°/Z_s = 360°/(Z_r - 2)$.

It follows, therefore, that $Z_s = Z_r - 2$.

In addition, for a symmetrical stepping motor with faultless step angle, the number of stator pole teeth must be divisible by the number of stator main poles without a remainder, which, it is easy to see, is a requirement that cannot be met for a 3.6° step angle motor where the number of rotor teeth $Z_r$ must be 25.

2. Another reason which argues against this known stepping motor design is the fact that at the required small motor diameter, the introduction of eight stator main pole windings and their wiring would only be possible at extremely high production costs.

By way of contrast, in the new stepping motor according to the present invention, as already mentioned in section A above, only four stator poles, and correspondingly only half the number of stator pole windings specified for the known motor, are required.

A symmetrical design of the stator with four poles for a faultless step angle can be achieved if two conditions are satisfied; first, $\tau_r = 360°/Z_r$ and
$\tau_s = 360°/Z_s = 360°/(Z_r - 1 \pm k)$ where k denotes an even integer (to ensure that $Z_s \neq Z_r$) and $0 \leq k \leq 6$, and second, the number of stator pole teeth $Z_s$ must be divisible by the number of stator poles without a remainder.

With $Z_r = 25$, it follows that $Z_s = 24$ at $k = 0$. Both requirements are thus met.

As a practical matter, in a motor according to the present invention the value of k, absent special considerations related to the magnitude of the step angle required (depending on whether the number of type characters is somewhat above or below 100, the step angle may have to be somewhat smaller or greater than 3.6°), will always be chosen to be 0. It should be understood, however, that by choosing $k > 0$ (but always an even number), it also becomes possible, for a given stator (or rotor) construction, to vary the number of rotor (or stator) teeth, and thus the step angle, within certain limits in both directions, as the situation demands. The significance of the number k will be more clearly understood from the following examples, which are presented merely by way of illustration.

EXAMPLE 1

Assuming $Z_s = 24$ and $k = 0$, then $Z_r = 25$ and $\phi = 360°/4 \times 25 = 3.6°$.

EXAMPLE 2

Assuming $Z_s = 24$ and $k = 2$, then $Z_r = 27$ and $\phi = 360°/4 \times 27 = 3.33°$.

EXAMPLE 3

Assuming $Z_s = 20$ and $k = 4$, then $Z_r = 25$ and $\phi = 3.6°$.

EXAMPLE 4

Assuming $Z_s = 20$ and $k = 6$, then $Z_r = 27$ and $\phi = 3.33°$.

From these examples it can be seen that by suitably using the equation $Z_s = Z_r - 1 \pm k$ or its equivalent $Z_r = Z_s + 1 \pm k$, one can achieve different step angles by providing different numbers of rotor teeth for a given number of stator pole teeth (Examples 1 and 2), or one can achieve identical step angles by providing different number of stator pole teeth for a given number of rotor teeth (Examples 1 and 3), etc. Other combinations are, of course, also possible, and which of the various combinations (whether specified above or not) is selected as best suited for any given application will be decided on a case by case basis. The stepping motor of the present invention thus can be adapted to any required number or spacing of the type characters at a given plastic disc diameter.

(D) Measures for Simplifying and Reducing the Costs of Stator Windings

These are represented in FIGS. 3–3A–3B–3C, 4–4A–4B, and 5 to 8.

In actual practice, stepping motors of the known types having eight stator poles are made with the individual pole or field windings consisting of two bifilar partial windings each, which are so wired that a symmetrical winding with center tap is formed. All stator pole windings wich center tap thus formed are connected in parallel, phase by phase. This, however, entails relatively high wiring costs.

Figure 3:
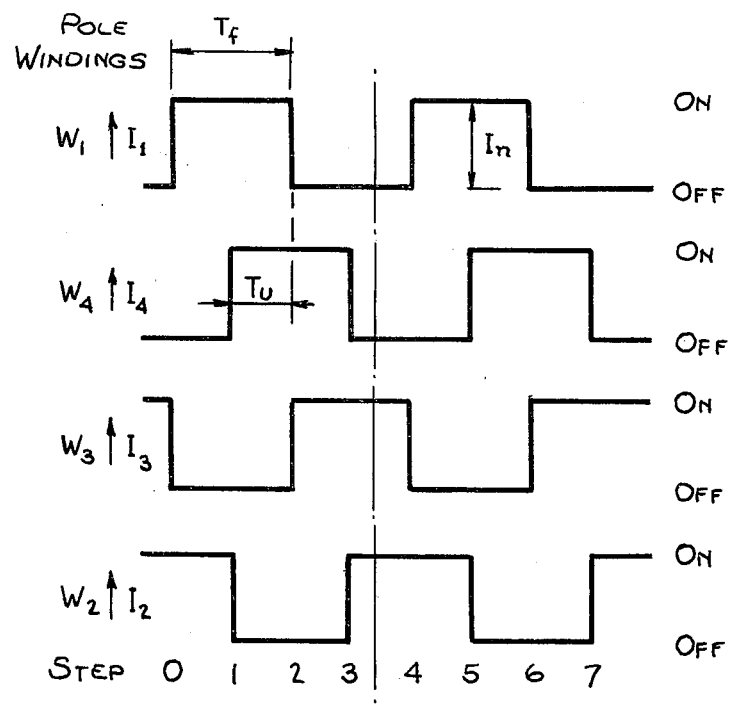
FIG. 3 is a view similar to FIG. 2 and illustrates the stator with a set of monofilar windings on the stator poles, the insulation being shown in heavy black lines but only schematically for the sake of simplicity.

In accordance with one aspect of the present invention, therefore, it is contemplated to utilize, as a means for minimizing the winding and wiring costs incident to the manufacture of stepping motors with only four stator poles, four monofilar or single-wire windings W-1, W-2, W-3 and W-4, one for each pole 12 of the stator 11 (FIG. 3). Concomitantly it is proposed to connect the windings into a control circuit 39 (FIG. 3A), which has a power source 40 and a pair of reversing control switches 41 and 42 (these are illustrated in conventional form but in actual practice are electronic switches such as transistors, flip-flops, etc.) shiftable between respective positions or conductive states I/II and III/IV. In the circuit 39, the two windings of each of the diametrally opposed pairs of windings W-1/W-3 and W-2/W-4 have a respective common connection between those windings, designated 43 and 44 in FIG. 3A, connected to the same terminal 45 of the power source 40. The arrangement of the control circuitry is such that after any given step only one winding per phase is energized, i.e. either W-1 or W-3 and either W-2 or W-4.

To this end it will be understood that the various electronic switches 41 and 42, composed of suitable circuit elements and configurations, e.g. transistors, gates, flip-flops, or the like, well known to those skilled in the art and not necessary to illustrate or describe in detail, are themselves controlled and shifted from one current carrying state to another by means of suitably timed electronic pulses or input signals. The pulse sequence (and hence the winding energization sequence) for the circuit arrangement represented purely schematically by FIG. 3A and the resultant sequence of stator pole polarities are diagrammatically illustrated in FIGS. 3B and 3C, respectively. In FIG. 3B, $T_f$ denotes the time duration of the energized state of each winding (it is the same for all windings), $I_n$ denotes the current amplitude in each energized winding (it is the same in all windings and is also denoted $I_1$ to $I_4$ for the windings W-1 to W-4, respectively), and $T_u$ denotes the time interval overlap between energization states of the windings which is required to effect the polarity changes of the windings in each phase.

In operation: At step 0 (time 0), while the electronic switch 42 is still in the state thereof denoted III in FIG. 3A, so that winding W-2 is and remains "on," the switch 41 is shifted to its state I. As a result, current $I_2$ continues to flow in winding W-2, and winding W-1 turns "on" as current $I_1$ begins to flow in winding W-1. Both of these windings thus provide "N" polarities at their respective stator poles (FIG. 3C), while windings W-3 and W-4 are "off." At step 1 (time $\frac{1}{2} T_f$) following a time overlap interval $T_u$ of concurrent energization of the windings W-1 and W-2, the switch 42 is shifted to its state IV while the switch 41 remains in its state I; the winding W-2 thus is deenergized as its current $I_2$ is turned "off" while the winding W-4 is energized as the flow of current $I_4$ commences (FIG. 3B). The "N" polarity of winding W-1 thus remains but the winding W-4 now provides a "S" polarity for its respective stator pole (FIG. 3C). The manner of continuation of the winding energization sequence and the polarity shifting sequence thereafter can be readily understood from FIGS. 3B and 3C and will thus not be further described, except to point out that at step 4 the overall cycle resumes again, with the various conditions at that time once more being the same as at the previous step 0.

The sequence of polarity changes effected by the current flow sequence in the windings W-1 to W-4 is, of course, the means by which, in known fashion not necessary to describe in detail, the permanent magnet rotor 14 is moved stepwise in a given direction of rotation as a consequence of the magnetic interactions between the stator and the rotor resulting from the different numbers of rotor and stator pole teeth and their relative instantaneous dispositions. It will also be apparent to those skilled in the art that by appropriately changing the pulse or energization sequence in the pairs of windings W-1/W-3 and W-2/W-4, it is possible to reverse the motor, i.e. to rotate the rotor in a direction opposite to the direction resulting from the sequence described above.

The principles of the present invention as so far described can also be applied to a stepping motor utilizing bifilar or two-wire windings W-1.1/W-1.2, W-2.1/W-2.2, W-3.1/W-3.2 and W-4.1/W-4.2 on the stator poles 12 (FIG. 4). In this type of system, however, there exists the further possibility of varying the internal resistance of the motor windings in order to adapt the motor, without any change in the basic control principle, to operation with different control circuits. Thus, the resistance of the windings can be varied as required by the gate voltage or current flow characteristics of the transistors, flip-flops, etc. used in the control circuit, by suitably selecting certain connections between the various coils or winding sections internally of the motor. Merely by way of example, a resistance-decreasing parallel connection of the stator partial windings W-1.1/W-1.2 etc., utilizing respective paired leads 46, 47, 48 and 49, is shown in FIG. 4A, and a resistance-increasing series connection of the stator partial windings W-1.1/W-1.2 etc., utilizing respective single leads 50, 51, 52 and 53, is shown in FIG. 4B.

In accordance with another aspect of the present invention, the insulation member 22 (FIG. 1) is a twin-section specially shaped structure 54 made of any suitable electrically non-conductive synthetic plastic material and best shown in FIGS. 5 to 8. The insulation member is constructed to enable all four stator poles to be covered on all sides of the same, leaving only an opening or gap about 2 mm wide between adjacent stator poles for the introduction of the wire guides of a needle winding machine, to permit all four stator pole windings to be inserted simultaneously. Since the insulation member 54 consists of two identical sections 54a and 54b, a brief description of one of these will suffice for both.

As shown, each insulator section is an annular structure and includes a flat ring portion 55 the outer diameter of which is substantially the same as the diameter of the circular locus of the surface portions 29a (see also FIG. 2) of the stator winding spaces 29. At one side of the ring 55 there are provided four radially inwardly depending planar webs 56 alternating with four laterally extending, circumferentially elongated, hollow protuberances 57, of which the latter are shaped and dimensioned to fit precisely into the spaces 29 in the stator and are provided at their radially inward sides 57a with respective axially extending gaps 57b not less than 2 mm wide, while the former are adapted precisely to overlie the lateral outside faces of the stator poles 12 at one side of the stator. Extending laterally rom each of the four planar webs 56 but in a direction opposite to that of the protuberances 57 are four circularly curved arcuate webs 58 which are circumferentially spaced from one another by respective axially extending gaps 59 not less than 2 mm wide and precisely aligned with the gaps 57b. The portions 57a of the protuberances 57 in essence are lateral continuations of the arcuate webs 58 but are somewhat thinner. In this manner, therefore, there are provided a set of arcuate shoulders 60 which extend to opposite sides of the inward faces of planar webs 56 and engage the stator poles 12 generally coextensively with the teeth-bearing portions of the latter.

Figure 6:
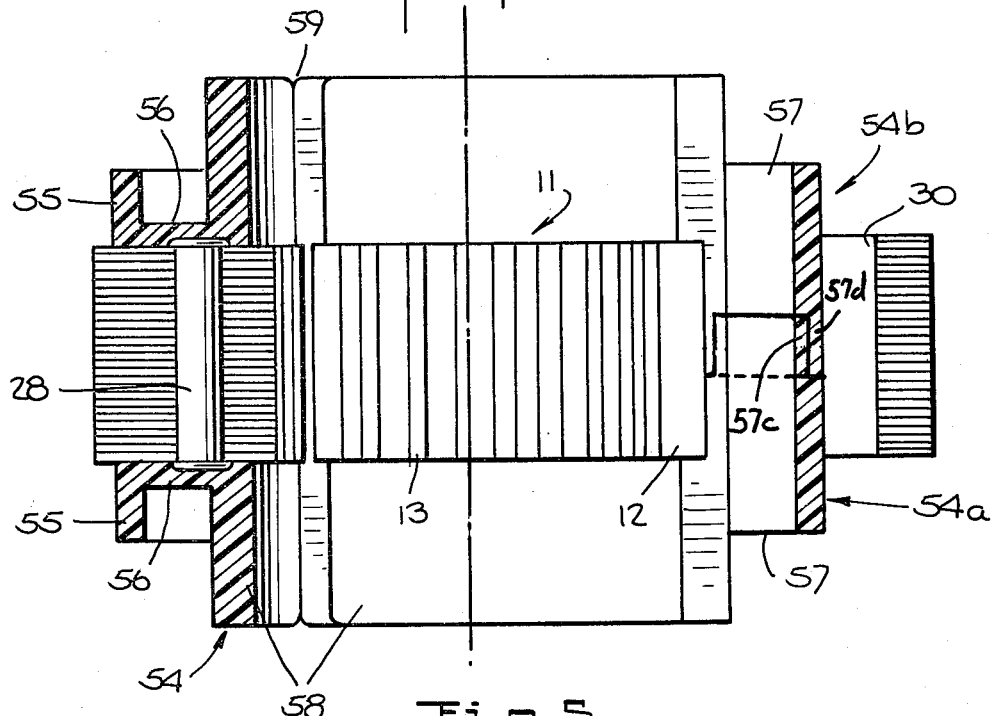
FIG. 6 is a sectional view taken along the line 6—6 in FIG. 5.
Figure 5:
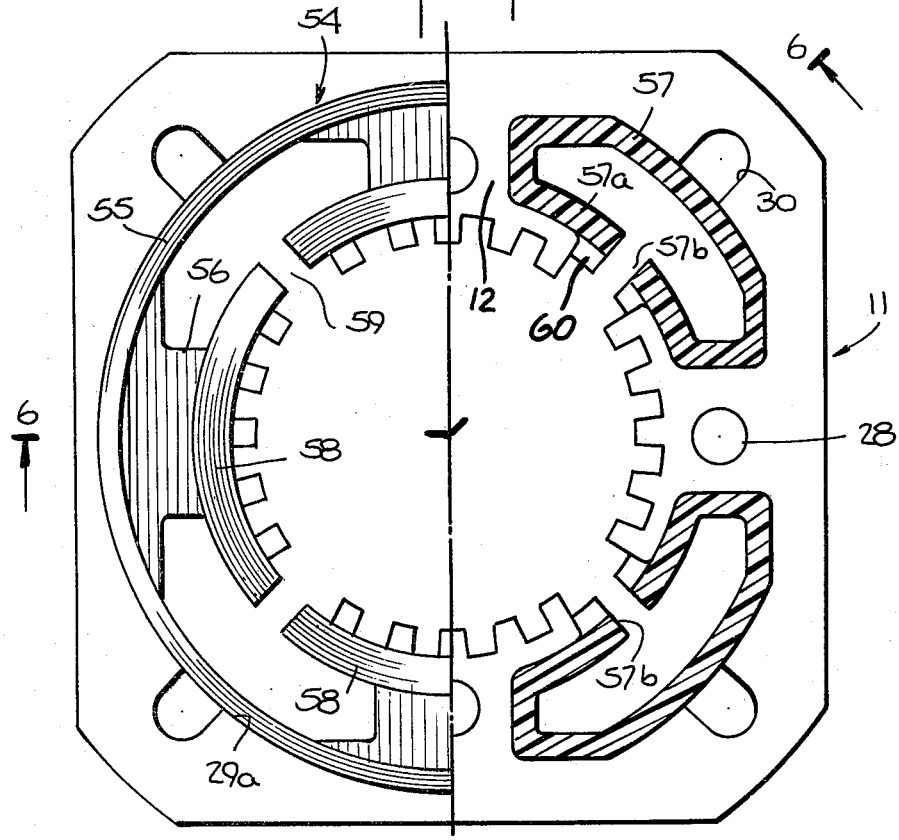
FIG. 5 is a view similar to FIGS. 3 and 4 but partly in section and illustrates only the stator with a twin-section insulation member covering the poles.

In addition, two diametrically opposed ones of the protuberances 57 are provided at their free ends with a circumferential edge region of externally slightly reduced thickness, as shown at 57c for the insulation section 54a in FIGS. 6 and 8, and correspondingly the other two protuberances are provided at their free ends with a circumferential edge region of internally slightly reduced thickness, as shown in FIGS. 6 and 8 at 57d for the insulation section 54b. The arrangement is such that in use, the two insulator sections 54a and 54b are fitted into the stator 11 but displaced 90° out of mirror image relation to each other. Thus, the two sets of protuberances are aligned with one another, but they are in an alternating sequence telescoped slihgtly into each other, i.e. two opposed ones of the protuberances on one insulator section fit slightly into the protuberances of the other section aligned therewith, and vice versa for the other two. The aligned gaps 59/57b, of course, constitute the previously mentioned winding gaps while the interiors of the aligned protuberances 57 define the spaces for accommodating the field windings of the motor.

The implementation of the individual but interrelated innovations described hereinabove in sections A, B, C and D, has been found to lead to the production of a novel stepping motor which fully meets all expectations in terms of minimization of size without sacrifice of power, increased efficiency, the choice of step angle, and the lowering of production costs. Thus, over and above the advantages already adverted to hereinbefore, the cubic form of the motor not only means lesser space requirements for it, but also that the square 4-pole construction of the stator which makes the cubic form attainable can itself be manufactured with an economical use of materials and a minimum amount of waste. Still further, in a motor of the present invention the amount of available winding space for its small size is maximized.

A motor according to the present invention, when made and used as a stepping motor, is particularly suitable for its special task as herein disclosed. It is to be noted, however, that a stronger motor, built with only four stator poles according to the homopolar principle and operated as a self-starting synchronous motor, tends to run very noisily due to unbalanced radial forces occurring in the bearings. The use of such a stronger motor as a self-starting synchronous motor would, therefore, be not highly recommended.

It will be understood that the foregoing description of various aspects of the present invention is for purposes of illustration only, and that the structural and operational features and relationships herein disclosed are susceptible to a number of modifications and changes none of which entails any departure from the spirit and scope of the present invention as defined in the hereto appended claims.

What is claimed is:

1. In a stepping motor of the homopolar design and having a housing, a shaft journaled in the housing, a rotor secured to the shaft, and a stator connected with the housing and concentrically surrounding the rotor with a working air gap therebetween, wherein the stator is a layered steel structure with a plurality of radially inwardly extending poles for the respective field windings and each of the stator poles is provided on the end face thereof at the working air gap with a plurality of stator pole teeth at a uniform pitch, insulation means is provided for covering the stator poles so as to isolate the field windings electrically therefrom, the rotor includes an axially magnetized permanent magnet and two magnetically conductive annular steel members sandwiching the magnet therebetween and provided on their circumferential faces at the working air gap with respective identical sets of rotor teeth at a uniform pitch but with the rotor teeth on each annular member offset by a half pitch with respect to the rotor teeth on the other annular member, the shaft is magnetically non-conductive, and the housing includes a pair of magnetically non-conductive bearing bells; the improvement comprising that:

(a) the stator is a single-section hollow structure devoid of an external yoke for the magnetic return in the axial direction and has a generally square transaxial shape with straight sides and slightly rounded or chamfered corners;

(b) each of the two bearing bells has a transaxial shape the same as that of the stator, and means are provided for securing the bearing bells to the stator at the respective opposite faces of the latter and in alignment with the stator and each other to provide the motor with a generally cubic form;

(c) the stator has only four stator poles and four field windings are wound about said stator poles, respectively, and each of the stator poles extends from the middle region of a respective one of the four straight sides of the stator and has four or five stator pole teeth;

(d) the pitch of the rotor teeth is expressed by the relation $\tau_r = 360°/Z_r$ and the pitch of the stator pole teeth by the relation $\tau_s = 360°/Z_s = 360°/(Z_r - 1 \pm k)$, where $Z_r$ is the number of rotor teeth, $Z_s$ is the theoretical number of stator pole teeth consisting of the sum of the actual number of stator pole teeth plus the number of such teeth omitted between adjacent stator poles and must be divisible by 4, k is an even integer with $0 \leq k \leq 6$, and for a given value of either $Z_r$ or $Z_s$, k is so chosen that the step angle of the motor is about 3.6°;

(e) the permanent magnet of the rotor is a thin ring disc structure of a highly coercive magnetic material with an energy density $(B \times H)_{max} \geq 10$ MGOe and a ratio of disc diameter to disc thickness ranging from about 4 to about 20;

(f) the two annular members on which the rotor teeth are provided are ring disc structures which are of somewhat greater diameter than the permanent magnet and on their sides facing each other and the magnet are provided with respective axial projections beveled inwardly at an angle of about 30°-60° down to the outer circumference of the magnet; and (g) the insulation means is a composite annular structure consisting of two unitary annular sections fitted into the stator from opposite sides thereof and covering all parts of the stator poles except the toothed end faces thereof, the insulation structure being of such configuration as to leave between adjacent stator poles respective wire winding gaps each not less than 2 mm wide.

2. A stepping motor as claimed in claim 1, wherein the stator and each of the bearing bells is provided in the respective four corner regions thereof with four through bores parallel to the motor axis, and the securing means are bolts extending through the respective bores.

3. A stepping motor as claimed in claim 1, wherein the two insulation structure sections are identical and each has at one side a set of four circumferentially spaced hollow protuberances shaped and dimensioned to fit smoothly into the spaces between the stator poles and axially split at their radially inward portions to define said wire winding gaps, two diametrally opposed ones of said protuberances on each of said sections being externally slightly reduced in thickness at their free end edges and the other two protuberances on each section being internally slightly reduced in thickness, and the two sections being fitted into the stator from opposite sides thereof with the respective sets of protuberances aligned with and facing each other but displaced 90° out of mirror image relation to each other and with alternate ones of the protuberances on each section being slightly telescoped into the respective aligned ones of the protuberances on the other section.

4. A stepping motor as claimed in claim 1, wherein the field windings are monofilar single-wire windings, each field winding wound on a given stator pole has a first one of its terminals connected in a common electrical juncture with a first one of the terminals of the field winding wound on the oppositely located stator pole, the two common electrical junctures are connected to a common point for connection to one terminal of a power source, and the non-common second terminals of each opposed pair of field windings are connected to separate points for selective connection via respective control switches with an opposite terminal of the power source.

5. A stepping motor as claimed in claim 4, wherein means are provided for selectively operating said control switches in predetermined timed relation so that only one field winding per phase is connected to the power source after each step.

6. A stepping motor as claimed in claim 1, wherein the field windings are bifilar two-wire windings with the two partial windings being connected in parallel with each other, each pair of partial windings wound on a given stator pole has a first one of its terminals connected in a common electrical juncture with a first one of the terminals of the pair of partial windings wound on the oppositely located stator pole, the two common electrical junctures are connected to a common point for connection to one terminal of a power source, and the non-common second terminals of each two opposed pairs of partial windings are connected to separate points for selective connection via respective control switches with an opposite terminal of the power source.

7. A stepping motor as claimed in claim 6, wherein means are provided for selectively operating said control switches in predetermined timed relation so that only one field winding per phase is connected to the power source after each step.

8. A stepping motor as claimed in claim 1, wherein the field windings are bifilar or two-wire windings with the two partial windings being connected in series with each other, each pair of partial windings wound on a given stator pole has a first one of its terminals connected in a common electrial juncture with a first one of the terminals of the pair of partial windings wound on the oppositely located stator pole, the two common electrical junctures are connected to a common point for connection to one terminal of a power source, and the non-common second terminals of each two opposed pairs of partial windings are connected to separate points for selective connection via respective control switches with an opposite terminal of the power source.

9. A stepping motor as claimed in claim 8, wherein means are provided for selectively operating said control switches in predetermined timed relation so that only one field winding per phase is connected to the power source after each step.

10. A stepping motor as claimed in claim 1, wherein the angle of each of the bevels on said axial projections of the two annular members of the rotor is about 45°.

11. A stepping motor as claimed in claim 1, wherein the magnetic material of the permanent magnet is a cobalt/rare earth metal alloy.

* * * * *